United States Patent
Shani (10) Patent No.: US 9,328,526 B2
(45) Date of Patent: May 3, 2016

(54) VEHICLE POSITIONING SYSTEM

(71) Applicant: UNITRONICS AUTOMATED SOLUTIONS LTD., Ben Gurion Airport (IL)

(72) Inventor: Haim Shani, Shoham (IL)

(73) Assignee: UNITRONICS AUTOMATED SOLUTIONS LTD, Ben Gurion Airport (IL)

( * ) Notice: Subject to any disclaimer, the term of this patent is extended or adjusted under 35 U.S.C. 154(b) by 253 days.

(21) Appl. No.: 13/625,012

(22) Filed: Sep. 24, 2012

(65) Prior Publication Data

US 2013/0078063 A1  Mar. 28, 2013

Related U.S. Application Data

(60) Provisional application No. 61/537,646, filed on Sep. 22, 2011.

(51) Int. Cl.
  *B60S 13/02*  (2006.01)
  *E04H 6/28*  (2006.01)
  *E04H 6/42*  (2006.01)

(52) U.S. Cl.
  CPC .................. *E04H 6/28* (2013.01); *E04H 6/424* (2013.01); *B60S 13/02* (2013.01)

(58) Field of Classification Search
  CPC ............ B60S 13/02; E04H 6/424; E04H 6/28
  USPC .............................................. 414/231; 104/44
  See application file for complete search history.

(56) References Cited

U.S. PATENT DOCUMENTS

| | | | |
|---|---|---|---|
| 4,166,546 A * | 9/1979 | English | 414/263 |
| 4,608,929 A * | 9/1986 | Park | 104/44 |
| 5,012,745 A * | 5/1991 | Yamashita | 104/44 |
| 5,148,752 A * | 9/1992 | Yamashita | 104/44 |
| 5,469,676 A | 11/1995 | Coleman | |
| 5,669,753 A * | 9/1997 | Schween | 414/800 |
| 5,755,160 A * | 5/1998 | Blufordcraving | 104/36 |
| 6,229,455 B1 * | 5/2001 | Yost et al. | 340/943 |

* cited by examiner

*Primary Examiner* — Saul Rodriguez
*Assistant Examiner* — Mark Hageman
(74) *Attorney, Agent, or Firm* — Pearl Cohen Zedek Latzer Baratz LLP (57) ABSTRACT

An automated vehicle positioning system for use with a transport mechanism of an automated vehicle conveying system comprising one or more position sensors for detecting a position of a vehicle on a rotatable platform; and a controller adapted to control a travel distance of the rotatable platform for directionally aligning the vehicle to a conveying direction of the transport mechanism and for aligning a centerline of the vehicle with a centerline of the transport mechanism.

3 Claims, 5 Drawing Sheets

VEHICLE POSITIONING SYSTEM

CROSS-REFERENCE TO RELATED APPLICATIONS

This application claims benefit from U.S. Provisional Patent Application No. 61/537,646 filed 22 Sep. 2011 which is hereby incorporated in its entirety by reference.

FIELD OF THE INVENTION

The present invention relates to automatic parking systems generally and to a vehicle positioning system for use with automated parking systems in particular.

BACKGROUND OF THE INVENTION

Automated parking systems have increased in demand over the last 20 years as the number of automobiles continuously increase worldwide and land availability for parking spaces continuously decrease. This increased demand may be particularly felt in large cities, especially in urban centers, where land is frequently allocated for high-rise office and residential buildings which are occupied by large concentrations of people, many with vehicles, and limited space is allocated for parking purposes.

In an attempt to solve the limited parking space problem, multi-story parking structures able to accommodate a relatively large number of vehicles in each floor are frequently constructed. These multi-story parking structures are generally configured to allow vehicles to be driven through each floor by their drivers in search of a parking space. These "drive-through" parking structures frequently include facilities and equipment to support movement of people within the parking structure. For example, they may include relatively high-power illumination systems to allow drivers to see where they are going, or ventilation systems to remove vehicle exhaust gases and maintain suitable fresh air flow inside the structure. They may also include elevators for transporting the drivers between floors, stairs interconnecting the various floors, among other facilities and equipment.

Other types of multi-story parking structures may include automated parking facilities. Automated parking facilities generally eliminate the need for the vehicle to be driven through the structure. These types of facilities generally include parking slots in each floor into which a driverless vehicle is placed by an automated conveying system. The automated conveying system may also be used to remove the vehicle from the parking slot when the vehicle is returned to the driver. In automated parking facilities, drivers typically self-drive their vehicle into a vehicle positioning station where it may be accessed by a transport mechanism which is part of the automated conveyor system. The transport mechanism, which may include a shuttle car, an elevator, a crane, a movable platform, or any other type of equipment suitable for moving and/or lifting the vehicle, may load the vehicle and transport it to its respective parking place. An example of such a vehicle positioning station is described in U.S. Pat. No. 5,469,676 to Colsman.

A potential advantage of automated parking facilities over drive-through parking structures is a substantial reduction in facilities and equipment required to support people as there is very limited people movement inside the facility (only where vehicles are received and returned to drivers). An additional potential advantage is that the overall parking area may be increased as ramps connecting the various floors are not required and a height between floors may be made substantially low, sufficient to accommodate a height of the vehicles. More information on automated parking facilities may be obtained at Applicant's website at www.unitronics.com.

SUMMARY OF THE PRESENT INVENTION

There is provided, in accordance with an embodiment of the present invention, an automated vehicle positioning system for use with a transport mechanism of an automated vehicle conveying system comprising one or more position sensors for detecting a position of a vehicle on a rotatable platform; and a controller adapted to control a travel distance of the rotatable platform for directionally aligning the vehicle to a conveying direction of the transport mechanism and for aligning a centerline of the vehicle with a centerline of the transport mechanism.

In accordance with an embodiment of the present invention, the automated vehicle positioning system further comprises a motorized motion mechanism adapted to drive the rotatable platform responsive to a control signal from the controller.

In accordance with an embodiment of the present invention, the automated vehicle positioning system further comprises a rotatable platform.

In accordance with an embodiment of the present invention, the automated vehicle positioning system further comprises an interface module for interfacing the controller with the transport mechanism.

In accordance with an embodiment of the present invention, the controller is further adapted to control movement of the transport mechanism.

In accordance with an embodiment of the present invention, the at least one position sensor includes any one of a proximity sensor, an imaging device, an IR detector, a light sensor, a laser measurement sensor, an IR detector, and a contact detector.

There is provided, in accordance with an embodiment of the present invention, a method of automatically aligning a vehicle in a vehicle positioning station with a transport mechanism in an automated conveyor system comprising: detecting a position of a vehicle on a rotatable platform in the vehicle positioning station; calculating a travel distance of the rotatable platform for directionally aligning the vehicle to a conveying direction of the transport mechanism; rotating the rotatable platform over the travel distance; calculating an offset distance between a centerline of the vehicle and a centerline of the transport mechanism; and moving the transport mechanism over the offset distance for aligning the centerlines of the vehicle and the transport mechanism.

In accordance with an embodiment of the present invention, detecting includes determining a distance from a position sensor to a reference point on the vehicle.

In accordance with an embodiment of the present invention, the reference point is one of a corner of the vehicle, a side of the vehicle, a wheel of the vehicle, a front of the vehicle, a back of the vehicle, a headlight of the vehicle, and a taillight of the vehicle.

In accordance with an embodiment of the present invention, the travel distance is one of an angular distance, a linear distance, and a sectorial distance.

In accordance with an embodiment of the present invention, the method further comprises controlling the rotating of the rotatable platform.

In accordance with an embodiment of the present invention, the method further comprises interfacing with the transport mechanism for controlling the moving.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Automated parking facilities generally require that a driver self-drive into a vehicle positioning station and position the vehicle so that it is properly aligned with respect to the transport mechanism. This generally entails aligning a center longitudinal axis (centerline) of the vehicle with a centerline of the transport mechanism. Frequently, drivers must repeatedly move the vehicle, adjusting its position until the vehicle and the transport mechanism are properly aligned.

To assist a driver position the vehicle, the vehicle positioning station is frequently equipped with guiding mechanisms. These may include guide barriers on each side of the vehicle so that the vehicle is properly aligned when positioned between the barriers; markings on the floor of the station such as, for example, lines and arrow, that may be followed by the driver; and electronic means including sensors and display means that may be used to guide the driver, and may include guiding lights and/or a computer display. Regardless of the type of guiding mechanism, vehicle positioning stations generally require driver participation in the vehicle alignment process, which may be time consuming and a burden both for the driver and for an operator of the automated parking facility.

Applicants have devised a vehicle positioning system which may allow driver-less alignment of the vehicle and the transport mechanism irrespective of an initial position of the vehicle in the vehicle positioning station. In a three-step automatic process, the vehicle positioning system may automatically (1) detect a position of the vehicle; (2) directionally align the vehicle with a conveying direction of the transport mechanism; and (3) shift a position of the transport mechanism so that its centerline coincides with the centerline of the vehicle;

Applicants have realized that the vehicle positioning system may provide a more efficient alternative to existing systems requiring driver intervention, allowing vehicles to be moved in and out from automated parking facilities at a faster rate. This may potentially increase profitability of the automated parking facility (as more vehicles may be handled over a same period of time) while reducing possible user discomfort due to repeated adjusting of the vehicle's position by reducing user intervention in the alignment process.

Applicants have further realized that the principles of the vehicle positioning system described herein may be equally applicable to other fields not related to vehicular parking/storage and which may involve automatically adjusting a position of an item to allow its centerline to coincide with that of a transport mechanism or a grasping mechanism (mechanism to grasp the item). A person skilled in the art may realize that applications may include any type of automatic storage system which may include an automatic conveying system, automatic machining systems, and automatic package handling systems, among many other type of systems.

Figure 1:
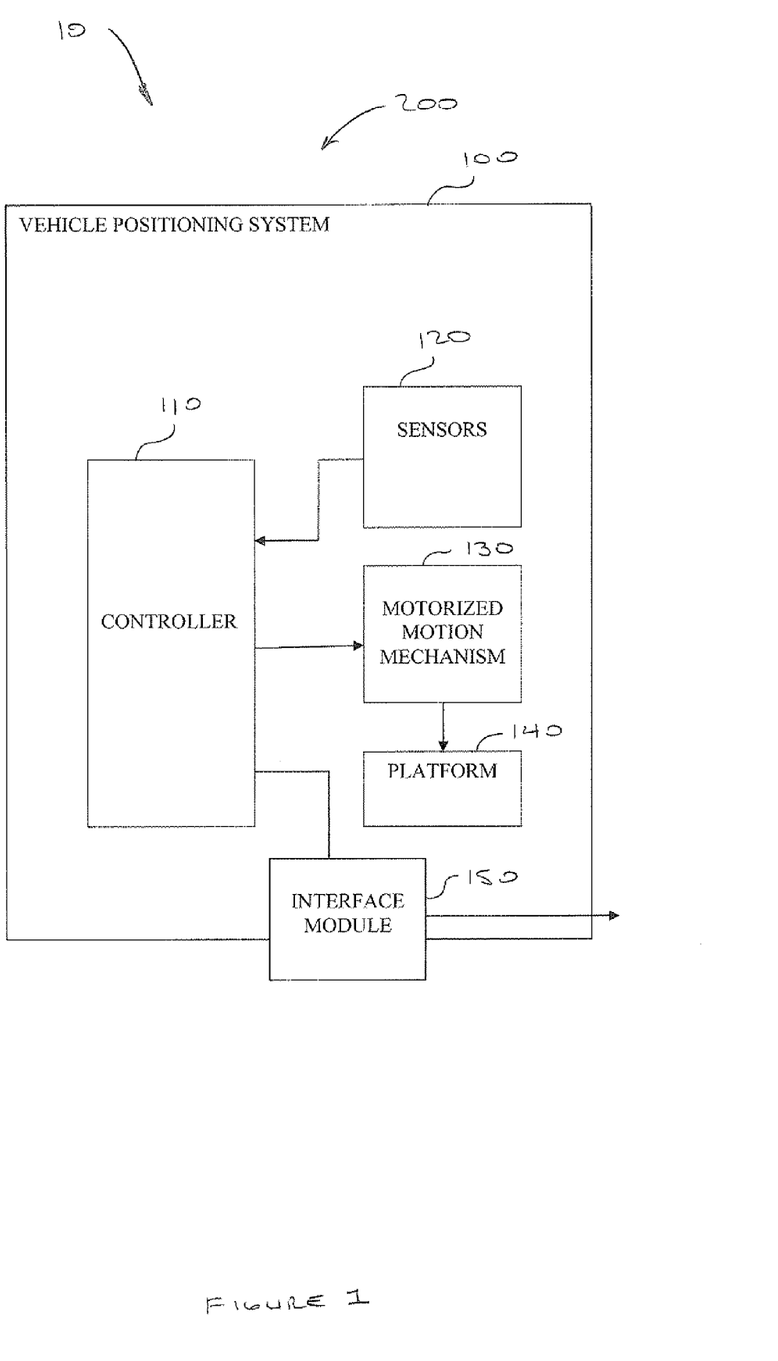
FIG. 1 schematically illustrates a block diagram of an exemplary vehicle positioning system, according to an embodiment of the present invention.

Reference is now made to FIG. 1 which schematically illustrates a block diagram of an exemplary vehicle positioning system 100, according to an embodiment of the present invention. Vehicle positioning system 100 may be included in an automated vehicle conveying system 20 which may be used in an automated parking facility 10.

According to an exemplary embodiment of the present invention, vehicle positioning system 100 may include a controller 110; one or more position sensors 120; a motorized motion mechanism 130 which may include, for example, a servo mechanism; a rotatable platform 140; and an interface module 150. Vehicle positioning system 100 may be configured to detect a position of a vehicle (e.g. vehicle 30 in FIGS. 2-4) resting on rotatable platform 140, and to adjust a position of the rotatable platform so as to bring a longitudinal axis of the vehicle (e.g. center line of vehicle, axis 35 in FIGS. 2-4) into directional alignment with a direction of conveyance (e.g. conveying direction axis 50 in FIG. 3) of a transport mechanism (e.g. transport mechanism 40 in FIGS. 2 and 4) in automated vehicle conveying system 20. Vehicle positioning system 100 may be further configured to control a position of the transport mechanism in order to bring a vehicle centerline (axis 35 in FIGS. 2-4) and a transport mechanism centerline (axis 45 in FIGS. 2-4) to coincide.

Position sensors 120 may be configured to detect a position of the vehicle resting on rotatable platform 140 and to transmit this information to controller 110. The transmitted information may include detection data associated with distances to reference locations on the vehicle, for example, a distance from a sensor to a corner of the vehicle; a distance from a sensor to a side of the vehicle; a distance from a sensor to a front of the vehicle; a distance from a sensor to a back of the vehicle; a distance from a sensor to a wheel of the vehicle; a distance from a sensor to a headlight of the vehicle; a distance from a sensor to a tail light of the vehicle; a distance from a sensor to a front of the vehicle; a distance from a sensor to a back door of the vehicle; among other reference locations in the vehicle which may be detected by position sensors 120. The distances may be linear distances or vectorial distances which may include angle and linear distance. The transmitted information may additionally include any one or any combination of reference information associated with the conveying direction of the transport mechanism, the centerline of the transport mechanism, the centerline of the vehicle, and the centerline of the rotatable platform. The transmitted information may be sent from position sensors 120 to controller 110 over wireless means and/or wired means, and may be transmitted on a real-time basis. Alternatively, the information may be transmitted at predetermined interval. Alternatively, the information may be transmitted initially when vehicle 30 is driven onto rotatable platform 140.

Position sensors 120 may include one or more sensors and may be any type of sensor suitable for position detection. These may include proximity sensors, imaging devices (e.g. video camera and stills camera), IR detectors, light sensors, laser measurement sensors, IR detectors, contact detectors, among others.

Controller 110 may be configured to process the information received from position sensors 120 and may calculate the position of the vehicle relative to the conveying direction of the transport mechanism. This may include calculating the centerline of the vehicle and calculating a distance from the centerline or from any other reference point on the vehicle to the conveying direction of the transport mechanism. This may further include calculating a position of the vehicle relative to a centerline of rotatable platform 140. Additionally, controller 110 may calculate a distance over which rotatable platform 140 may be rotated to directionally align the vehicle's centerline with the conveying direction of the transport mechanism. This distance may be calculated as an angular distance, a linear distance, and/or a sectorial distance. The distance may be calculated real-time based on real-time information received from position sensors 120. Additionally, controller 110 may calculate an offset distance between the vehicle's centerline and the transport mechanism's center line. The offset distance may be a linear distance between the two centerlines. Additionally or alternatively, controller 110 may calculate an offset distance between the center line of platform 140 and the transport mechanism's centerline. The calculations may be continuously updated, or alternatively periodically updated at predetermined intervals, responsive to the information received from continuously or periodically from position sensors 120. The calculations may be based on methods known in the art, and may include, for example, triangulation, trilateration, Euclidean distance measurements, among other geometrical positioning methods, some of which may be computationally simple (an example is provided in FIG. 3).

Controller 110 may be additionally configured to control servo mechanism 130 responsive to the information received from position sensors 120. Servo mechanism 130 may drive rotatable platform 140 and may cause the rotatable platform to rotate over the calculated distance responsive to control signals received from controller 110. The control signals may be continuously sent, or alternatively periodically sent at predetermined intervals, from controller 110 to servo mechanism 130. The control signal may be sent from controller 110 to servo mechanism 130 over wireless and/or wired means.

Controller 110 may be additionally configured to control movement of the transport mechanism to adjust for the offset distance and align the vehicle's centerline with that of the transport mechanism. Controller 110 may transmit the calculated offset distance through interface module 150 to a main controller (not shown) in automated vehicle conveying system 20 responsible for controlling the transport mechanism. The connection between interface module 150 and the main controller may be through wired and/or wireless means. In an alternate embodiment of the present invention, controller 110 may be the main controller in automated vehicle conveying system 20, configured to control the vehicle conveying system including vehicle positioning system 100.

Figure 2:
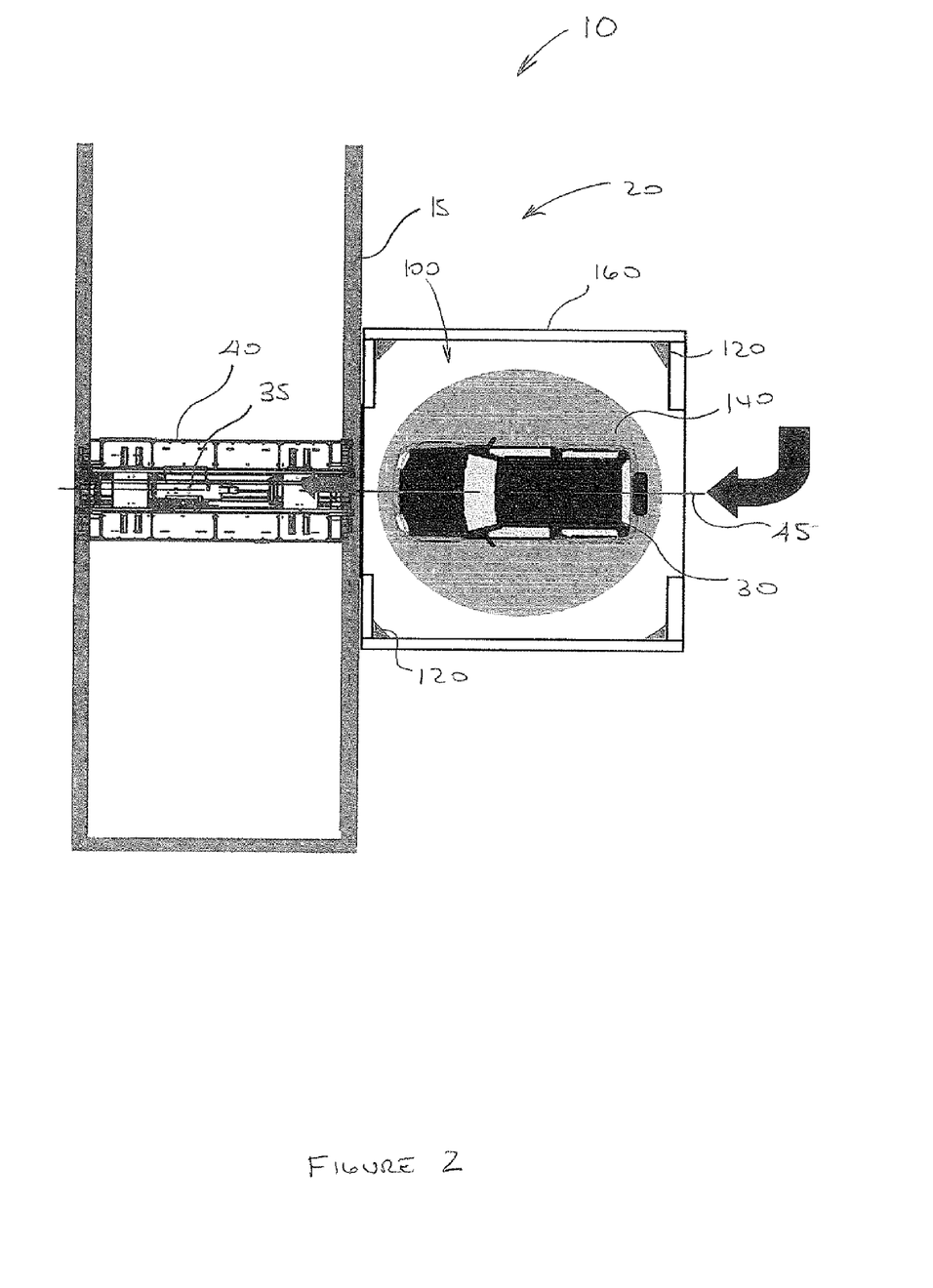
FIG. 2 schematically illustrates the automated parking facility of FIG. 1 with a vehicle in an exemplary vehicle positioning station, according to an embodiment of the present invention.

Reference is now also made to FIG. 2 which schematically illustrates automated parking facility 100 with a vehicle 30 in an exemplary vehicle positioning station 160, according to an embodiment of the present invention. Automated parking facility 100 may include a parking structure 15 including parking slots (not shown) for accommodating vehicle 30 using automated vehicle conveying system 20. Transport mechanism 40 may include a shuttle car which may be slid under vehicle 30 when vehicle centerline 35 is aligned with transport mechanism center line 45 (as shown), and which may lift the vehicle for moving it from vehicle positioning station 160 to an empty parking slot in structure 15. Additionally, shuttle car 40 may be used to return vehicle 30 from the parking slot to vehicle positioning station 160. In alternative embodiments of the present invention, transport mechanism 40 may include a crane, a lift, an elevator, a movable platform, a conveyor, or any other type of equipment suitable for moving and/or lifting vehicle 30 and transporting it to its respective parking slot in structure 15.

Vehicle positioning station 160 may house some or all of the components of vehicle positioning system 100, for example, rotatable platform 140 and position sensors 120. Vehicle positioning station 160 may be configured to receive vehicle 30 which may be driven into the vehicle positioning station by its driver and left resting on rotatable platform 140 in any position.

The position of vehicle 30 may be detected by position sensors 120 which may be placed, for example, at each corner of vehicle positioning station 160. Additionally or alternatively, position sensors 120 may be placed at other locations on vehicle positioning station 160, for example, anywhere along guard rails 170 (or walls) which are used to demarcate the perimeter of the vehicle positioning station, on rotatable platform 140, on structure 15, or at any other suitable location which allows detection of reference points on vehicle 30. Position sensors 120 may be directionally guidable for varying an area of detection, and may be responsive to directional guiding signals received from controller 110 and/or to an internal tracking mechanism in the sensors. Depending on the type of position sensor 120, the sensors may be placed at ground level or at a higher level, for example, at a height of the bottom of the chassis of vehicle 30, or at a height of the lights, the windows, or the roof, or higher, or any combination thereof.

Figure 3:
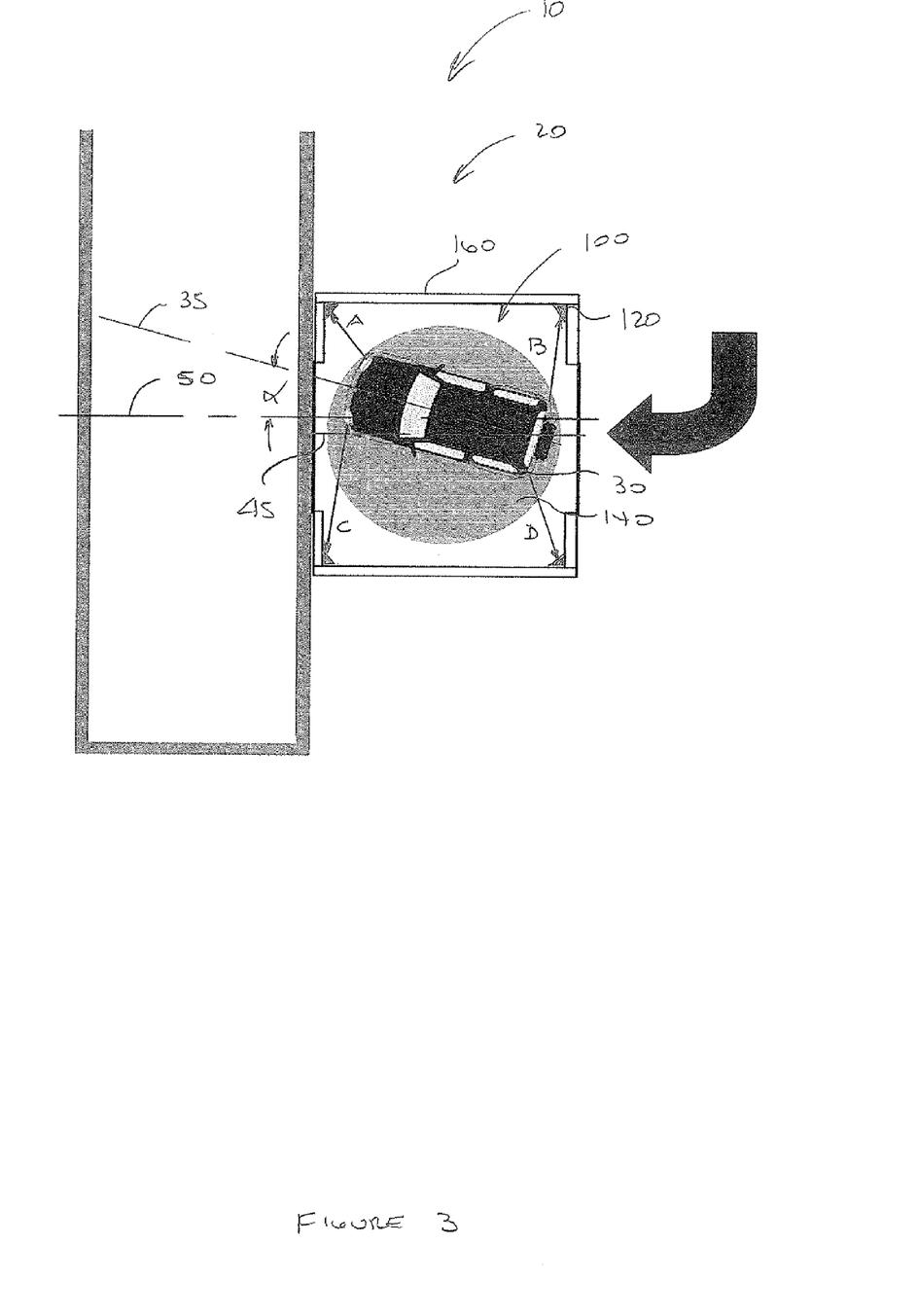
FIG. 3 schematically illustrates an exemplary situation where the vehicle in FIG. 2 is left by a driver on a rotatable platform in a position diverging from a conveying direction axis of a transport mechanism, according to an exemplary embodiment of the present invention.

Reference is now also made to FIG. 3 which schematically illustrates an exemplary situation where vehicle 30 is left by a driver on rotatable platform 140 in a position diverging from the conveying direction axis 50, according to an exemplary embodiment of the present invention. Vehicle positioning system 100 may detect the position of vehicle 30 through position sensors 120 which may transmit the acquired detection information, including measured distances to reference points on the vehicle, to controller 110. Controller 110 may use the received information from detection sensors 120 to directionally align vehicle 30 with conveying direction axis 50. It may also use the information to determine vehicle centerline 35 and to determine an angle of rotation α through which rotatable platform 140 may be rotated to align the vehicle's centerline with the direction of conveyance, axis 50. Alternatively, controller may use any longitudinal axis in vehicle 30 (not limited to vehicle centerline 35). Additionally or alternatively, controller 110 may determine a time of rotation based on a drive speed of servo mechanism 130. Additionally or alternatively, controller 110 may rotate rotatable platform 140 and may track the relative position of vehicle 30 relative to sensors 120 for determining when the vehicle centerline 35 is aligned with the direction of conveyance, axis 50.

The following is an example of how vehicle 30 may be directionally aligned to conveying direction axis 50:

Each position sensor 120 of the four position sensors may measure a distance A, B, C, and D, respectively, to a corner of the four corners of vehicle 30 and transmits the measured data to controller 110. The following relationship exists between the measured distances:

$$A+C=B+D$$

When vehicle 30 is directionally aligned with converging direction axis 50, A=B and C=D. Therefore, by controller 110 calculating the measured distances and stopping rotation of rotatable platform 140 when these equalities are achieved will result in vehicle 30 being directionally aligned with conveying direction axis 50. It should be noted and as previously stated, A, B, C and D do not have to be measured to the corner of the vehicle but can be measured to other reference points, for example, the sides of the vehicle. In alternate embodiments of the present invention, depending on the location of position sensors 120, direction alignment may also be achieved by measuring maximum or minimum distances from each of position sensor 120 to its respective reference point on vehicle 30.

Figure 4:
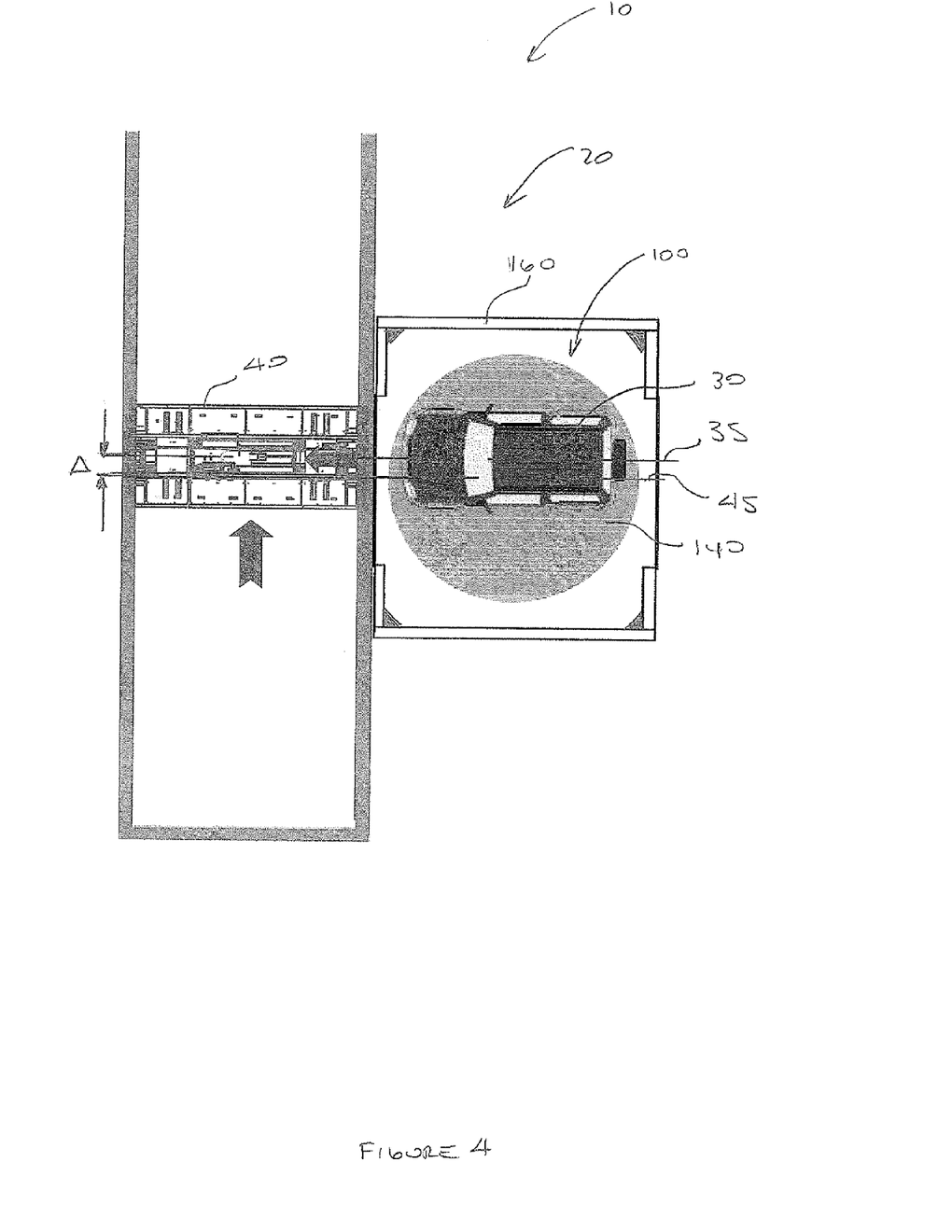
FIG. 4 schematically illustrates the vehicle on the rotatable platform following alignment of the vehicle's centerline with the conveying axis, and an offset distance Δ from the transport mechanism's centerline, according to an embodiment of the present invention.

Reference is now also made to FIG. 4 which schematically illustrates vehicle 30 on rotatable platform 140 following alignment of vehicle centerline 35 with the direction of conveyance, axis 50, and an offset distance Δ from transport mechanism centerline 45, according to an embodiment of the present invention. Vehicle positioning system may detect the position of vehicle 30 through position sensors 120 which may transmit the acquired detection information to controller 110. Controller 110 may use the received information from detection sensors 120 to determine the offset distance Δ between vehicle centerline 35 and transport mechanism centerline 45. Once the offset distance Δ has been calculated by controller 110, the controller may send a signal to automated conveyor system 20 to move transport mechanism 40 by the offset distance Δ in the direction of vehicle 30. In an alternative embodiment of the present invention, controller 110 controls the offset movement of transport mechanism 40. In an alternative embodiment of the present invention, controller 110 may determine the offset distance Δ using the same information received from position sensor 120 for calculating alignment with conveying direction axis 50.

The following is an example of how vehicle centerline 35 may be aligned with transport mechanism centerline 45, and is based on the previous example described with relation to FIG. 3 and directional alignment of vehicle 30 with conveying direction axis 50:

The following equation describes the relationship between Δ and the measured distances A, B, C, and D associated with directional alignment:

$$\Delta = A - C = B - D$$

Therefore, controller 110 calculating the differences in the measured distances before starting directional alignment of vehicle 30 and after directional alignment will yield the offset distance Δ required to align vehicle centerline 35 with transport mechanism centerline 45. Transport mechanism 40 is shifted by the distance Δ in the direction towards directionally aligned vehicle 30.

Figure 5:
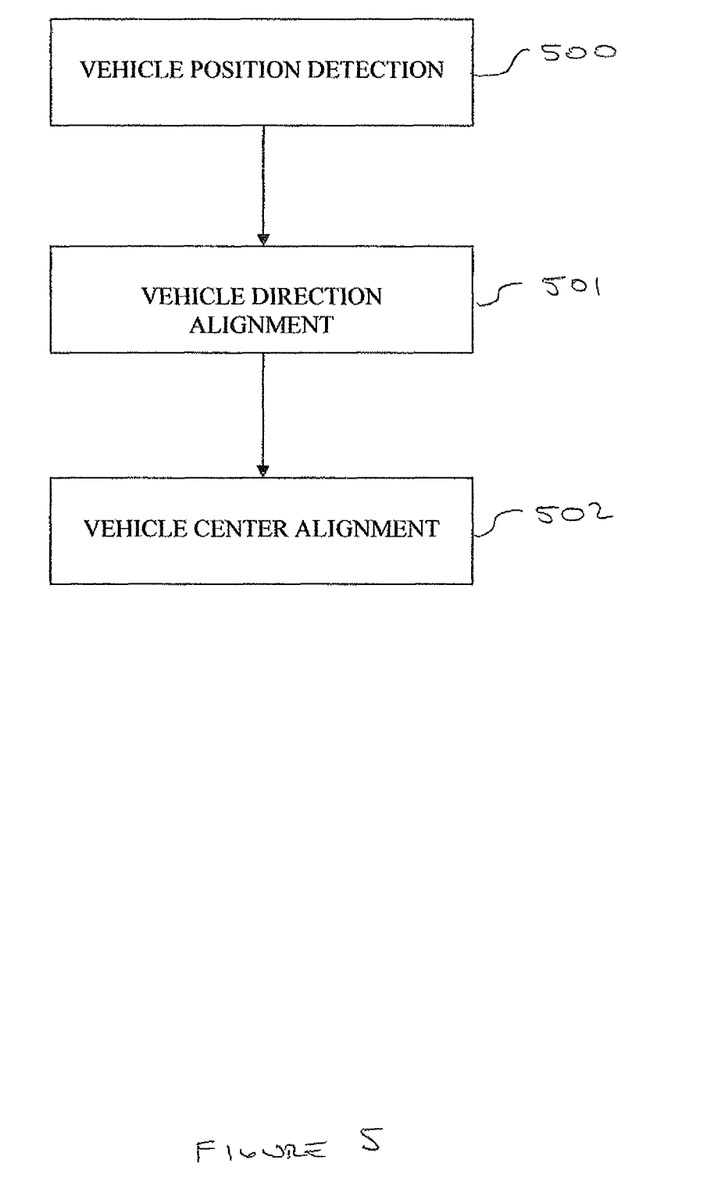
FIG. 5 illustrates a flow graph of an exemplary method of automatically aligning a vehicle in a vehicle positioning station with a transport mechanism in an automated conveyor system, according to an exemplary embodiment of the present invention.

Reference is now made to FIG. 5 which illustrates a flow graph of an exemplary method of automatically aligning a vehicle in a vehicle positioning station with a transport mechanism in an automated conveyor system, according to an exemplary embodiment of the present invention. For convenience in describing the method, reference will be made to vehicle positioning system 100 and to automated conveyor system 20.

At 500, the position of vehicle 30 on rotatable platform 30 may be determined Position sensors 120 may capture detection information regarding predetermined reference points on vehicle 30 and transmit the information to controller 110 in vehicle positioning system 100. The detection information may include measured distances, which may include linear distances or vectorial distances, from position sensors 120 to the reference points, for example, distances A, B, C, and D shown in FIG. 3. In alternate embodiments of the present invention, according to the method for measuring distance, the number of reference points may be less than 4, for example 3 or 2, or may be greater than 4, for example 5, 6, 7, 8, or more. Using the detection information, controller 110 may determine a rotation distance or an angle which is to be covered by rotatable platform 140 for direction alignment.

At 501, directional alignment of vehicle 30 is performed by rotating rotatable platform 140 until the vehicle directionally aligns with conveying direction axis 50. The rotation distance or angle may have been previously determined at 500. In alternate embodiments of the present invention, the rotation distance or angle may be calculated real-time by controller 110 based on detection information continuously, or periodically, received from position sensors 120. For example, rotatable platform 140 may be stopped when A=B or C=D per the example of FIG. 3, at which time vehicle 30 is directionally aligned with conveying direction axis 50.

At 502, centerline alignment of vehicle 30 with transport mechanism 40 may be performed. The offset distance Δ may be computed by controller 110 and transport mechanism 40 may be shifted in the direction of vehicle 30 by the offset distance Δ. Following shifting, vehicle centerline 35 and transport mechanism centerline 45 are aligned.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A vehicle positioning system for use with an automated vehicle conveying system having a transport mechanism and a rotatable platform, the vehicle positioning system comprising:
    a controller; and
    a plurality of position sensors for detecting a position of a vehicle on the rotatable platform and for transmitting to the controller information associated with distances between said plurality of position sensors and reference locations on the vehicle,
    wherein said controller is adapted to:
    process said distances information by:
        calculating a centerline of the vehicle;
        calculating a linear distance offset of the vehicle on the rotatable platform, between the centerline of the vehicle and a centerline of the transport mechanism; and
        calculating an angular offset of the vehicle on the rotatable platform, between the centerline of the vehicle and the centerline of the transport mechanism;
    control a motion mechanism of the rotatable platform to rotate the rotatable platform by the calculated angular offset for directionally aligning the centerline of the vehicle to a conveying direction of the transport mechanism; and
    control the transport mechanism to move in a direction of the vehicle with respect to the rotatable platform by the calculated linear offset,
    wherein said plurality of position sensors detect said position of said vehicle from a distance.

2. A vehicle positioning system according to claim 1, further comprising an interface module for interfacing said controller with the transport mechanism.

3. A vehicle positioning system according to claim 1, wherein said plurality of position sensors includes any one of a proximity sensor, an imaging device, a light sensor, a laser measurement sensor, and an IR detector.

* * * * *